(12) United States Patent
Corcoran et al.

(10) Patent No.: US 11,238,514 B2
(45) Date of Patent: Feb. 1, 2022

(54) METHOD AND SYSTEM FOR INTEGRATION OF MERCHANT TRADE AREAS INTO SEARCH RESULTS

(71) Applicant: MASTERCARD INTERNATIONAL INCORPORATED, Purchase, NY (US)

(72) Inventors: Gene Corcoran, Larchmont, NY (US); Kenneth Unser, Fairfield, CT (US); Bruce Macnair, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 120 days.

(21) Appl. No.: 16/516,414

(22) Filed: Jul. 19, 2019

(65) Prior Publication Data

US 2019/0340668 A1 Nov. 7, 2019

Related U.S. Application Data

(62) Division of application No. 14/451,885, filed on Aug. 5, 2014, now Pat. No. 10,402,882.

(51) Int. Cl.
*G06Q 30/00* (2012.01)
*G06Q 30/06* (2012.01)
(Continued)

(52) U.S. Cl.
CPC ........ *G06Q 30/0625* (2013.01); *G06F 17/10* (2013.01); *G06Q 30/02* (2013.01);
(Continued)

(58) Field of Classification Search
CPC . G06Q 30/0601–0645; G06Q 30/0204; G06Q 30/0202; G06Q 30/02;
(Continued)

(56) References Cited

U.S. PATENT DOCUMENTS

2003/0065595 A1* 4/2003 Anglum ................. G06Q 30/02
705/35
2009/0005987 A1* 1/2009 Vengroff ............... H04W 4/024
701/300

(Continued)

OTHER PUBLICATIONS

Trade Area Analysis. Mar. 30, 2011. Downtown and Business District Market Analysis. (Year: 2011).*

(Continued)

*Primary Examiner* — Allison G Wood
(74) *Attorney, Agent, or Firm* — Buchanan Ingersoll & Rooney PC (57) ABSTRACT

A method for identifying merchant trade areas for search result filtering includes: storing a plurality of merchant profiles, each profile including data related to a merchant including a merchant identifier and merchant geographic location; storing a plurality of transaction data entries, each entry including data related to a payment transaction including a specific merchant identifier and merchant geographic location associated with a merchant involved in the transaction, a consumer primary geographic location associated with a consumer involved in the transaction, and a travel distance based on a distance between the merchant and consumer primary geographic locations; identifying, for each merchant profile, merchant trade area data, the data including trade distances based on the travel distance included in transaction data entries where the included specific merchant identifier corresponds to the merchant identifier included in the respective merchant profile; and updating merchant profiles to include the respective identified merchant trade area data.

8 Claims, 7 Drawing Sheets

(51) Int. Cl.
*G06Q 30/02* (2012.01)
*G06F 17/10* (2006.01)
(52) U.S. Cl.
CPC ..... *G06Q 30/0201* (2013.01); *G06Q 30/0202* (2013.01); *G06Q 30/0204* (2013.01); *G06Q 30/0205* (2013.01); *G06Q 30/0601* (2013.01); *G06Q 30/0639* (2013.01)
(58) Field of Classification Search
CPC .......... G06Q 30/0205; G06Q 30/0201; G06Q 30/00639; G06F 17/10
USPC .......... 705/26.1–27.2, 2.33, 7.31, 7.34, 7.29
See application file for complete search history.

(56) References Cited

U.S. PATENT DOCUMENTS

| | | | |
|---|---|---|---|
| 2014/0236678 A1* | 8/2014 | Akerman | G06F 16/9537 705/7.34 |
| 2016/0034931 A1* | 2/2016 | D'Agostino | G06Q 30/0205 705/7.34 |

OTHER PUBLICATIONS

Trade Area Analysis, Downtown and Business District Market Analysis. Nov. 29, 2011. [Accessed via www.archive.org via https://web.archive.org/web/20111129193631/http://fyi.uwex.edu/downtown-marketanalysis/understanding-the-market/trade-area-analysis/].
Thrall, Grant Ian et al., "Trade-Area Analysis: The Buck Starts Here", Geospatial Solutions, Questex Media Group, Inc., Jun. 2000.

* cited by examiner

METHOD AND SYSTEM FOR INTEGRATION OF MERCHANT TRADE AREAS INTO SEARCH RESULTS

FIELD

The present disclosure relates to the identification of merchant trade areas for filtering of search results, specifically the use of geographic locations and transaction data to identify merchant trade areas and use thereof in filtering search results based on correspondence between merchant trade areas and consumer locations.

BACKGROUND

In an effort to improve search results provided to users, many search engines have begun to incorporate geographic data in identifying search results. For example, a user searching for "restaurants" may be provided with relevant search results as to restaurants generally, but also influenced by the user's current location and restaurants nearby. Thus, the user may be presented with results to nearby restaurants, as well as results regarding restaurants as identified using the search engine's normal searching algorithms.

In many instances, search engines use distance when identifying information to be included in, or filtered from, search results. For instance, when searching for a restaurant, the search engine may identify and include restaurants that are closest to the user in terms of distance, such as based on driving time and/or mileage. However, in some cases, the distance of a user to a merchant location may be misleading to both the user and the merchant. For example, the user may be geographically close to a merchant, but due to the layout of roads and/or levels of traffic, the merchant may be far away from the user in terms of the time it would actually take the user to get to the merchant.

Furthermore, in some instances the merchant's usual customer base may be located in a different location from the user, or a merchant who is preferred by people in the user's location may be located further away from the user than other merchants and thus left out of search results, or, in some cases, may be excluded by the search engine algorithm. Thus, there is a need for a technical solution to providing search engine results that are filtered based on the trade area of merchants.

SUMMARY

The present disclosure provides a description of systems and methods for identification of merchant trade areas and use thereof for filtering search results.

A method for identifying merchant trade areas for search result filtering includes: storing, in a merchant database, a plurality of merchant profiles, wherein at least one merchant profile includes data related to a merchant including at least a merchant identifier and merchant geographic location associated with the related merchant; storing, in a transaction database, a plurality of transaction data entries, wherein each transaction data entry includes data related to a payment transaction including at least a specific merchant identifier and merchant geographic location associated with a merchant involved in the related payment transaction, a consumer primary geographic location associated with a consumer involved in the related payment transaction, and a travel distance based on a distance between the merchant geographic location and consumer primary geographic location; identifying, for each merchant profile in the plurality of merchant profiles, merchant trade area data, wherein the merchant trade area data includes at least one trade distance based on the travel distance included in each transaction data entry of the plurality of transaction data entries where the included specific merchant identifier corresponds to the merchant identifier included in the respective merchant profile; updating, in the merchant database, at least one merchant profile to include the respective identified merchant trade area data; and transmitting, by a transmitting device, at least one merchant profile of the plurality of merchant profiles.

A method for filtering search results based on merchant trade areas includes: storing, in a merchant database, a plurality of merchant profiles, wherein at least one merchant profile includes data related to a merchant including at least a merchant identifier, a merchant geographic location, and one or more merchant trade distances, each merchant trade distance corresponding to a distance from the merchant geographic location encompassing geographic locations of a plurality of consumers involved in payment transactions with the related merchant; receiving, by a receiving device, search results, wherein the search results includes at least a consumer primary geographic location and a listing of specific merchant identifiers; identifying, in the merchant database, a subset of merchant profiles, wherein each merchant profile in the subset includes a merchant identifier corresponding to a specific merchant identifier included in the listing of specific merchant identifiers; filtering, by a processing device, the listing of specific merchant identifiers based on the consumer primary geographic location included in the received search results and the merchant geographic location and the one or more merchant trade distances included in each merchant profile of the identified subset of merchant profiles; and transmitting, by a transmitting device, at least the filtered listing of specific merchant identifiers.

A system for identifying merchant trade areas for search result filtering includes a merchant database, a transaction database, a processing device, and a transmitting device. The merchant database is configured to store a plurality of merchant profiles, wherein at least one merchant profile includes data related to a merchant including at least a merchant identifier and merchant geographic location associated with the related merchant. The transaction database is configured to store a plurality of transaction data entries, wherein at least one transaction data entry includes data related to a payment transaction including at least a specific merchant identifier and merchant geographic location associated with a merchant involved in the related payment transaction, a consumer primary geographic location associated with a consumer involved in the related payment transaction, and a travel distance based on a distance between the merchant geographic location and consumer primary geographic location. The processing device is configured to: identify, for at least one merchant profile in the plurality of merchant profiles, merchant trade area data, wherein the merchant trade area data includes at least one trade distance based on the travel distance included in each transaction data entry of the plurality of transaction data entries where the included specific merchant identifier corresponds to the merchant identifier included in the respective merchant profile; and update, in the merchant database, at least one merchant profile to include the respective identified merchant trade area data. The transmitting device is configured to transmit at least one merchant profile of the plurality of merchant profiles.

A system for filtering search results based on merchant trade areas includes a merchant database, a receiving device, a processing device, and a transmitting device. The merchant database is configured to store a plurality of merchant profiles, wherein at least one merchant profile includes data related to a merchant including at least a merchant identifier, a merchant geographic location, and one or more merchant trade distances, each merchant trade distance corresponding to a distance from the merchant geographic location encompassing geographic locations of a plurality of consumers involved in payment transactions with the related merchant. The receiving device is configured to receive search results, wherein the search results includes at least a consumer primary geographic location and a listing of specific merchant identifiers. The processing device is configured to: identify, in the merchant database, a subset of merchant profiles, wherein each merchant profile in the subset includes a merchant identifier corresponding to a specific merchant identifier included in the listing of specific merchant identifiers; and filter the listing of specific merchant identifiers based on the consumer primary geographic location included in the received search results and the merchant geographic location and the one or more merchant trade distances included in each merchant profile of the identified subset of merchant profiles. The transmitting device is configured to transmit at least the filtered listing of specific merchant identifiers.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Trade Area or Merchant Trade Area—A geographic area from which a particular merchant draws a certain percentage of its customers as evident from payment network transaction records.

System for Filtering Search Results Based on Merchant Trade Areas

Figure 1:
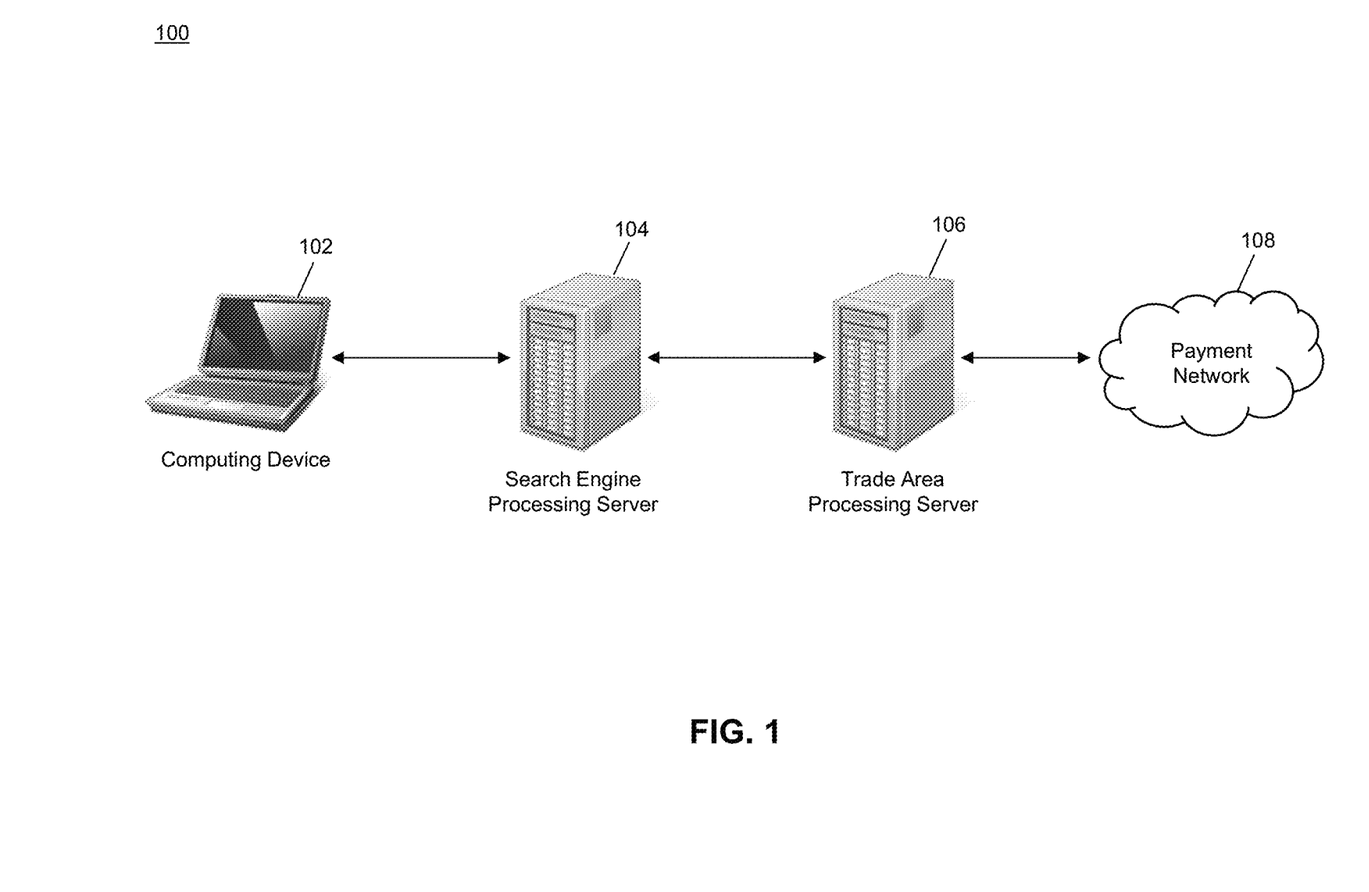
FIG. 1 is a high level architecture illustrating a system for identifying merchant trade areas and filtering search results in accordance with exemplary embodiments.

FIG. 1 illustrates a system 100 for the identification of merchant trade areas based on transaction data and the use thereof for the filtering of search engine results.

Figure 7:
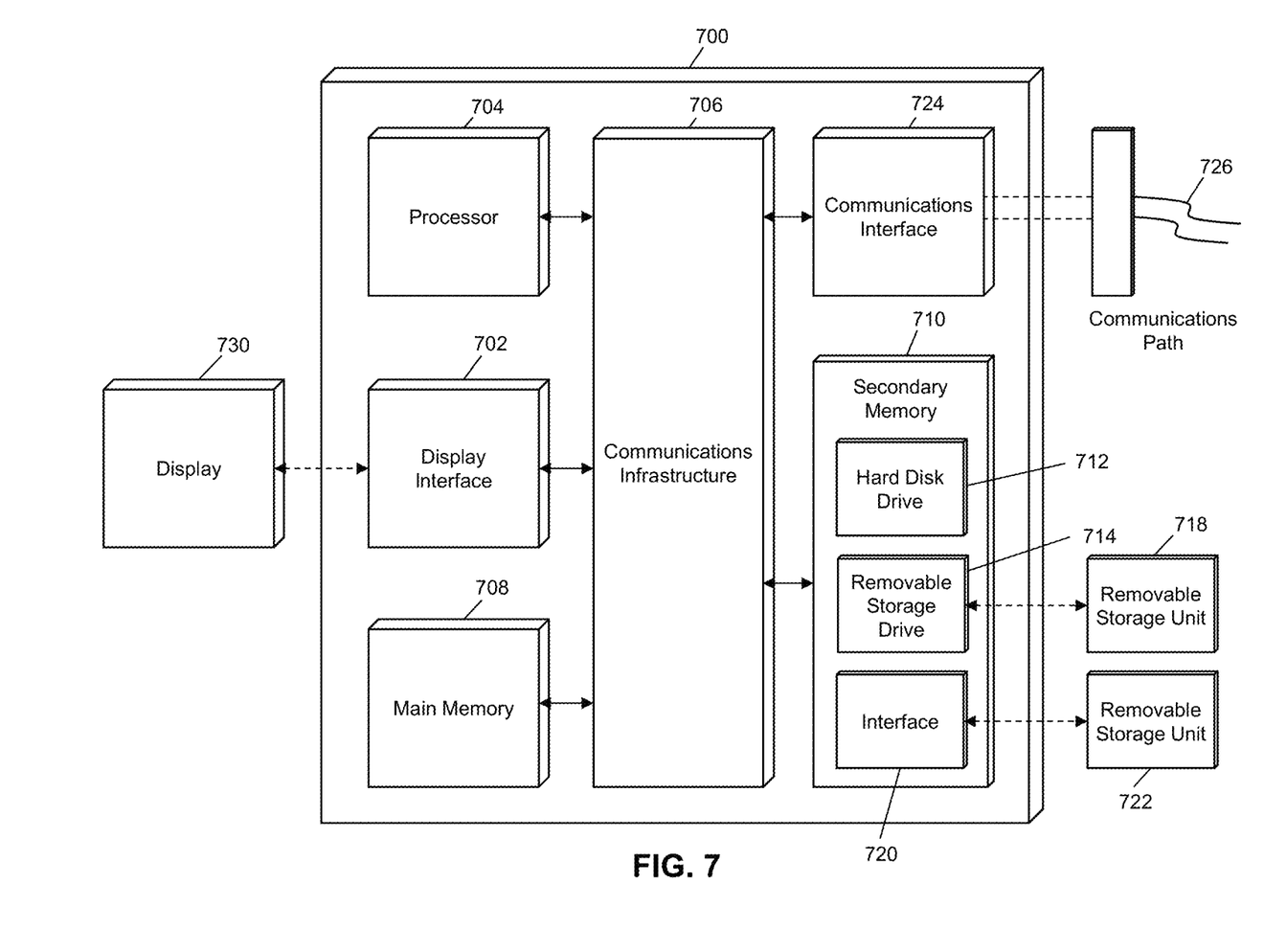
FIG. 7 is a block diagram illustrating a computer system architecture in accordance with exemplary embodiments.

The system 100 may include a computing device 102, an exemplary general architecture of which is shown in FIG. 7. The computing device 102 may be any type of computing device suitable for performing the functions disclosed herein, such as a desktop computer, laptop computer, notebook computer, tablet computer, cellular phone, smart phone, personal digital assistance, smart watch, smart television, etc. The computing device 102 may be configured to execute a web browsing application program.

A user of the computing device 102 may instruct the web browsing application program to visit a web page operated by, or otherwise associated with, a search engine, such as Google®, Yahoo®, Bing®, etc. The computing device 102 may receive search parameters from a user, such as keywords, search types, date ranges, categories, etc. The computing device 102 may then transmit those search parameters to a search engine processing server 104, such as over the Internet or other suitable type of network. For example, the search parameters may be entered into the web page, which may be submitted to a web server hosting the web page, and then transmitted to the search engine processing server 104.

The search engine processing server 104, discussed in more detail below, may receive the search parameters and then, using one or more search algorithms, identify search results. The search results may be transmitted back to the computing device 102 (e.g., via the visited web page), and then displayed to the user. In an exemplary embodiment, the search results may include one or more merchants and may be ordered, filtered, or otherwise modified based on trade areas associated with each of the one or more merchants.

The merchant trade areas may be identified by a trade area processing server 106. The trade area processing server 106, discussed in more detail below, may be configured to identify trade areas for merchants based on transaction data. The trade area processing server 106 may get transaction data for a plurality of payment transactions from a payment network 108. In some embodiments, the trade area processing server 106 may be a part of the payment network 108. The trade area processing server 106 may then identify trade areas for merchants based on geographic locations for consumers involved in payment transactions involving the respective merchant, identified in the received transaction data.

The trade area processing server 106 may transmit the trade area data to the search engine processing server 104. In some embodiments, the search engine processing server 104 and the trade area processing server 106 may be the same computing device or part of the same network. The search engine processing server 104 may then use the trade area data to filter search results based on the geographic location of the computing device 102 that submitted the search (e.g., or a geographic location provided as a search parameter). As discussed in more detail below, filtering the search results may include removing a merchant from the search results, or adding a merchant to the search results based on their trade area, reordering the search results (e.g., or moving a merchant further down or up a list of search results) based on a merchant's trade area, and more. In some instances, the filtering may be dependent on the one or more search algorithms used by the respective search engine.

Search Engine Processing Server

Figure 2:
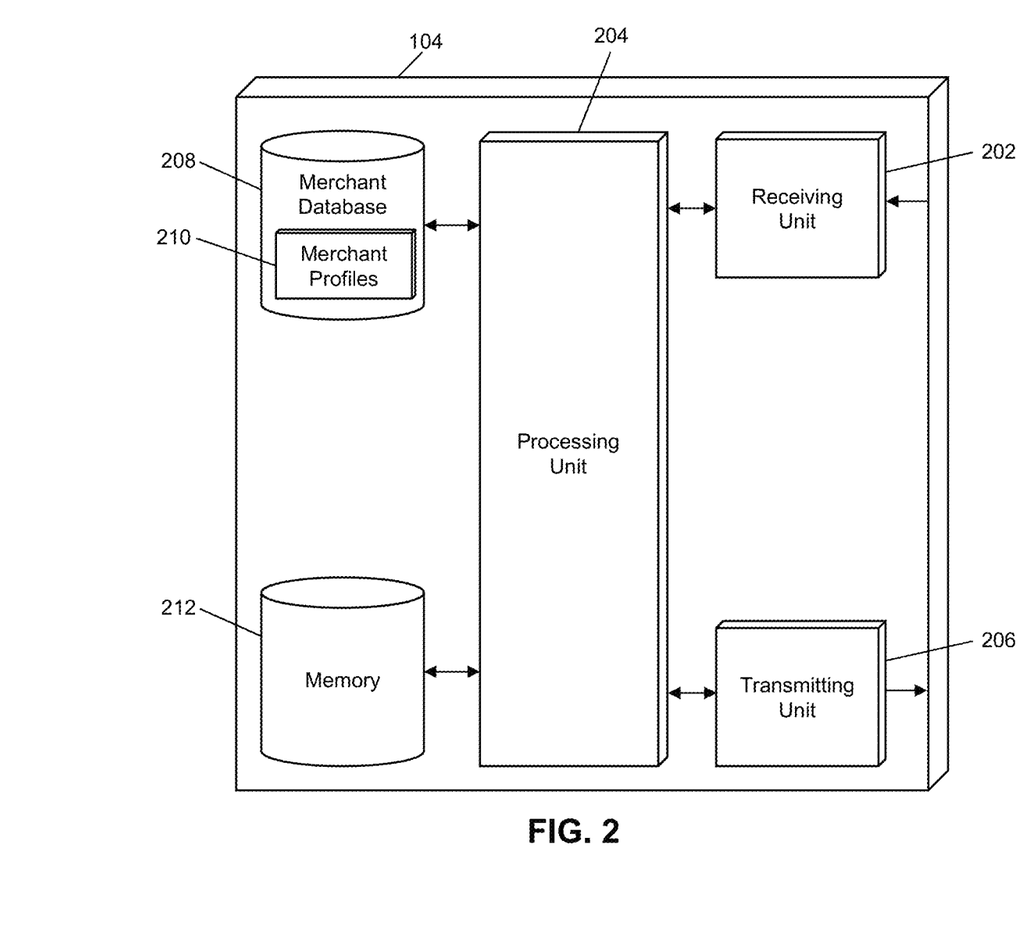
FIG. 2 is a block diagram illustrating the search engine processing server of FIG. 1 for the filtering of search results based on merchant trade areas in accordance with exemplary embodiments.

FIG. 2 illustrates an embodiment of the search engine processing server 104 of the system 100. It will be apparent to persons having skill in the relevant art that the embodiment of the search engine processing server 104 illustrated in FIG. 2 is provided as illustration only and may not be exhaustive to all possible configurations of the search engine processing server 104 suitable for performing the functions as discussed herein. For example, the computer system 700 illustrated in FIG. 7 and discussed in more detail below may be a suitable configuration of the search engine processing server 104.

The search engine processing server 104 may include a merchant database 208. The merchant database 208 may be configured to store a plurality of merchant profiles 210. Each merchant profile 210 may include data related to a merchant including at least a merchant identifier, a merchant geographic location, and one or more merchant trade areas. The merchant identifier may be a unique value suitable for identification of the respective merchant profile 210 and/or the related merchant, such as an identification number, street address, etc. The merchant geographic location may be a geographic location associated with the related merchant, such as geographic coordinates (e.g., latitude and longitude), a street address, zip code, postal code, etc. In some instances, the merchant geographic location and the merchant identifier may be the same value.

The one or more merchant trade areas may be geographic areas associated with the related merchant that encompass geographic locations of a plurality of consumers involved in payment transactions involving the related merchant. In some instances, the merchant trade areas may be represented as one or more distances, which may correspond to a distance from the merchant geographic location that encompasses the plurality of consumers. In other instances, the merchant trade areas may be geographic areas, such as represented by polygons, circles, ovals, or other suitable shapes, located at areas encompassing consumers involved in transactions involving the related merchant.

The search engine processing server 104 may further include a receiving unit 202. The receiving unit 202 may be configured to receive data over one or more networks via one or more network protocols. The receiving unit 202 may receive merchant trade area data from the trade area processing server 106. The search engine processing server 104 may also include a processing unit 204. The processing unit 204 may be configured to perform the functions of the search engine processing server 104 disclosed herein as will be apparent to persons having skill in the relevant art, including updating merchant profiles 210 stored in the merchant database 208 based on the received merchant trade area data.

The receiving unit 202 may be further configured to receive search parameters from the computing device 102. The processing unit 204 may be configured to identify search results based on the received search parameters using methods and systems that will be apparent to persons having skill in the relevant art. For example, the processing unit 204 may apply one or more search algorithms to the received search parameters to identify the search results. The one or more search algorithms and potential search results may be stored in a memory 212. The memory 212 may be configured to store data suitable for performing the functions disclosed herein.

The processing unit 204 may be further configured to filter the identified search results based on the one or more merchant trade areas included in the merchant profile 210 for each merchant included in the identified search results. The filtering of search results may be further based on the geographic location of the computing device 102 from which the search parameters are received, a geographic location included in the search parameters, or any other suitable value that may be used in the one or more search algorithms that will be apparent to persons having skill in the relevant art.

The search engine processing server 104 may also include a transmitting unit 206. The transmitting unit 206 may be configured to transmit data over one or more networks via one or more network protocols. The transmitting unit 206 may transmit the filtered search results to the computing device 102 (e.g., or to a web server for transmitting to and/or displaying to the computing device 102) for display to a user as a response to the submitted search request.

It will be apparent to persons having skill in the relevant art that the search engine processing server 104 may include additional components, and/or that the components illustrated in the search engine processing server 104 and discussed herein may be configured to perform additional functions, such as those components and/or functions associated with the traditional functions and processes of a search engine, such as the identification and storage of web page data, the identifying of search results, the filtering of search results based on user information, the inclusion of advertisements, etc.

Trade Area Processing Server

Figure 3:
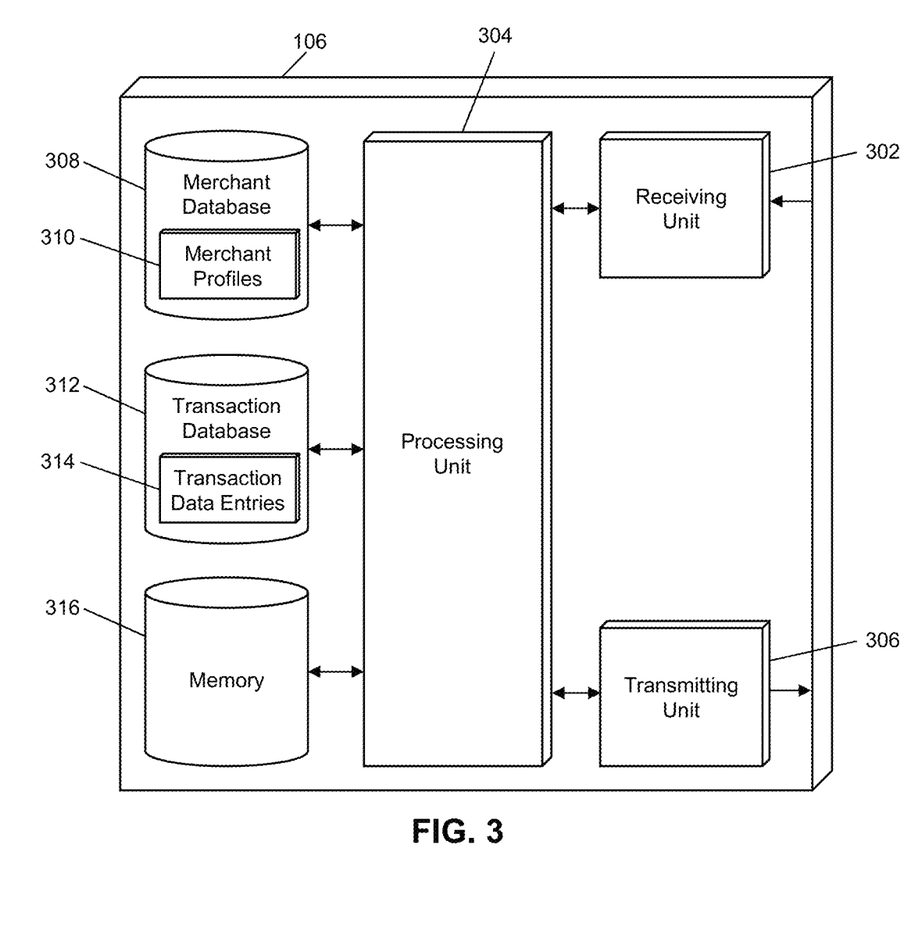
FIG. 3 is a block diagram illustrating the trade area processing server of FIG. 1 for the identification of merchant trade areas for use in the filtering of search results in accordance with exemplary embodiments.

FIG. 3 illustrates an embodiment of the trade area processing server 106 of the system 100. It will be apparent to persons having skill in the relevant art that the embodiment of the trade area processing server 106 illustrated in FIG. 3 is provided as illustration only and may not be exhaustive to all possible configurations of the trade area processing server 106 suitable for performing the functions as discussed herein. For example, the computer system 700 illustrated in FIG. 7 and discussed in more detail below may be a suitable configuration of the trade area processing server 106.

The trade area processing server 106 may include a merchant database 308. The merchant database 308 may be configured to store a plurality of merchant profiles 310. Each merchant profile 310 may include data related to a merchant including at least a merchant identifier and merchant geographic location. In some embodiments, each merchant profile 310 may further include one or more merchant trade areas and/or trade distances associated with the related merchant.

The trade area processing server 106 may also include a transaction database 312. The transaction database 312 may be configured to store a plurality of transaction data entries 314. Each transaction data entry 314 may be include data related to a payment transaction including at least a merchant identifier and merchant geographic location associated with a merchant involved in the related payment transaction, a consumer primary geographic location associated with a consumer involved in the related payment transaction, and a travel distance based on a distance between the merchant geographic location and the consumer primary geographic location. In some embodiments, the travel distance may be a straight-line distance between the two locations. In other embodiments, the travel distance may be a driving distance and/or time. In some instances, a travel time between the two locations may be based on traffic patterns at the time a search is being performed.

The merchant and consumer geographic locations may be a geographic location associated with the respective merchant or consumer, such as geographic coordinates (e.g., latitude and longitude), a street address, zip code, postal code, etc. In some embodiment, merchant or consumer primary geographic locations may be identified based on transaction data or other data available for the respective entity. In some instances, the consumer primary geographic location may be represented as the centroid of transactions made by the consumer, by a centroid of the area covered by a zip code, extended postal zip code or other postal code, or governmental demarcation (e.g., street, neighborhood, town, borough, city, county, etc.) where the associated consumer is primarily located (e.g., home or work, perhaps dependent on time of day).

The trade area processing server 106 may also include a receiving unit 302. The receiving unit 302 may be configured to receive data over one or more networks via one or more network providers. The receiving unit 302 may receive transaction data from the payment network 108. A processing unit 304 included in the trade area processing server 106 may be configured to store the received transaction data in the transaction database 312 as the transaction data entries 314. The processing unit 304 may be further configured to perform the functions of the trade area processing server 106 discussed herein, as will be apparent to persons having skill in the relevant art.

The processing unit 304 may be further configured to identify merchant trade areas for each merchant profile 310 stored in the merchant database 308. The merchant trade areas may include at least one trade distance based on the travel distance included in each transaction data entry 314 stored in the transaction database 312 that includes the respective merchant identifier. In some embodiments, multiple trade areas may be identified for a merchant profile 310, such as based on the trade distances and/or consumer primary geographic locations included in the associated transaction data entries 314. For example, a merchant may have three associated trade areas at three different store/merchant locations based on the trade distances and/or consumer locations, or three different trade distances based on percentage of customers that make up a trade area, as examples. The identification of multiple trade areas for a merchant based on trade distances and/or consumer locations will be apparent to persons having skill in the relevant art. The processing unit 304 may be further configured to update merchant profiles 310 in the merchant database 308 with the identified one or more merchant trade areas identified for each respective merchant profile 310.

In some embodiments, multiple trade areas and/or trade distances may be identified for each merchant profile 310 based on a portion of the plurality of consumers encompassed in the respective trade area and/or distance. For example, the processing unit 304 may identify three trade distances for a merchant, one that encompasses 75% of the travel distances, another that encompasses 50% of the travel distances, and another that encompasses 25% of the travel distances. In other embodiments, the trade areas and/or trade distances may be based on groupings of transaction data entries 314, such as based on transaction amounts, number of transactions in an area, consumer demographic data associated with consumers involve the transactions, and other suitable methods for grouping and/or categorizing the data that will be apparent to persons having skill in the relevant art.

The trade area processing server 106 may further include a transmitting unit 306. The transmitting unit 306 may be configured to transmit data over one or more networks via one or more network protocols. The transmitting unit 306 may transmit the identified merchant trade areas to the search engine processing server 104 for use in filtering search results. In some instances, the receiving unit 302 may receive a request for merchant trade areas from the search engine processing server 104. In such an instance, the processing unit 304 may identify merchant trade areas requested (e.g., based on locations of the trade areas, merchant identifiers included in the request, etc.), and the transmitting unit 306 may transmit the identified merchant trade areas in response to the request.

In some embodiments, the receiving unit 302 may receive search results from the search engine processing server 104. In such an embodiment, the processing unit 304 may be configured to filter the search results based on merchant trade areas for merchants included in the search results, such as previously identified merchant trade areas stored in the corresponding merchant profiles 310 in the merchant database 308. The transmitting unit 306 may be configured to transmit the filtered search results back to the search engine processing server 104 for presentation to the user. In such an embodiment, the search engine processing server 104 may not be configured to store merchant trade area data or filter search results based on the merchant trade areas.

The trade area processing server 106 may further include a memory 316. The memory 316 may be configured to store data suitable for performing the functions disclosed herein, such as algorithms or rules used for the identification of merchant trade areas from travel distances and/or consumer primary geographic locations, algorithms or rules used for filtering search results based on merchant trade areas, algorithms or rules used for identifying merchant profiles 310 with trade areas including a geographic location identified in a request, and additional data that will be apparent to persons having skill in the relevant art.

Process for Identifying Trade Areas and Filtering Search Results

Figure 4:
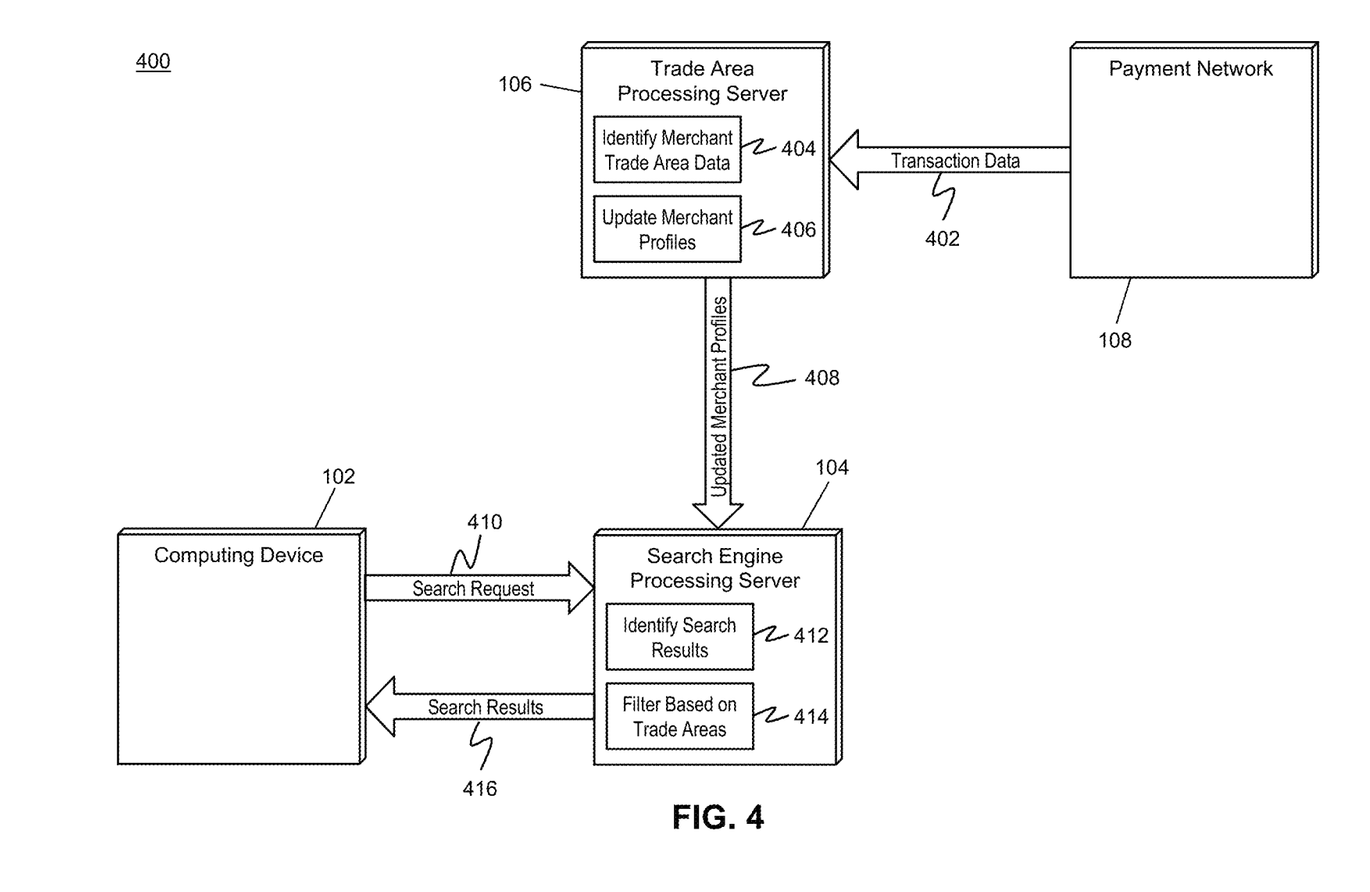
FIG. 4 is a flow diagram illustrating a process for identifying merchant trade areas and use thereof in filtering search results using the system of FIG. 1 in accordance with exemplary embodiments.

FIG. 4 illustrates a process 400 for the identification of merchant trade areas based on transaction data and use thereof to filter search results.

In step 402, the payment network 108 may transmit transaction data to the trade area processing server 106. The receiving unit 302 of the trade area processing server 106 may receive the transaction data, and the processing unit 304 of the trade area processing server 106 may store the transaction data in the transaction database 312 as a plurality of transaction data entries 314. Each transaction data entry 314 may include a merchant identifier, merchant geographic location, consumer primary geographic location, and travel distance based on the merchant and consumer primary geographic locations.

In step 404, the processing unit 304 of the trade area processing server 106 may identify merchant trade area data for each merchant profile 310 in the merchant database 308. The merchant trade area data may include one or more trade distances or areas based on the travel distance included in each transaction data entry 314 including the respective merchant identifier and/or the consumer primary geographic location included in each transaction data entry 314. In step 406, the processing unit 304 may update the merchant profiles 310 with the identified merchant trade area data.

In step 408, the transmitting unit 306 of the trade area processing server 106 may transmit the updated merchant profiles 310 to the search engine processing server 104. The receiving unit 202 of the search engine processing server 104 may receive the updated merchant profiles 310, and the processing unit 204 of the search engine processing server 104 may store the updated merchant profiles 310 in its own merchant database 208 as merchant profiles 210 or update previously stored merchant profiles 210 accordingly.

In step 410, the computing device 102 may submit a search request to the search engine processing server 104 (e.g., via a web server, application program, or other service). The search request may include a plurality of search parameters, one of which may include a geographic location associated with, or provided by, the computing device 102. The receiving unit 202 of the search engine processing server 104 may receive the search parameters. In step 412, the processing unit 204 of the search engine processing server 104 may identify search results based on the search parameters using methods and systems that will be apparent to persons having skill in the relevant art.

In step 414, the processing unit 204 may filter the search results based on the trade area data for each merchant included in the search results, identified in the corresponding merchant profiles 210. In some instances, filtering of the search results may include identifying current traffic data and its effect on travel times and/or travel distances, such as based on the trade distances included in the trade area data for the merchants included in the search results. In step 416, the transmitting unit 206 of the search engine processing server 104 may transmit the filtered search results to the computing device 102 for display to the user.

Figure 5:
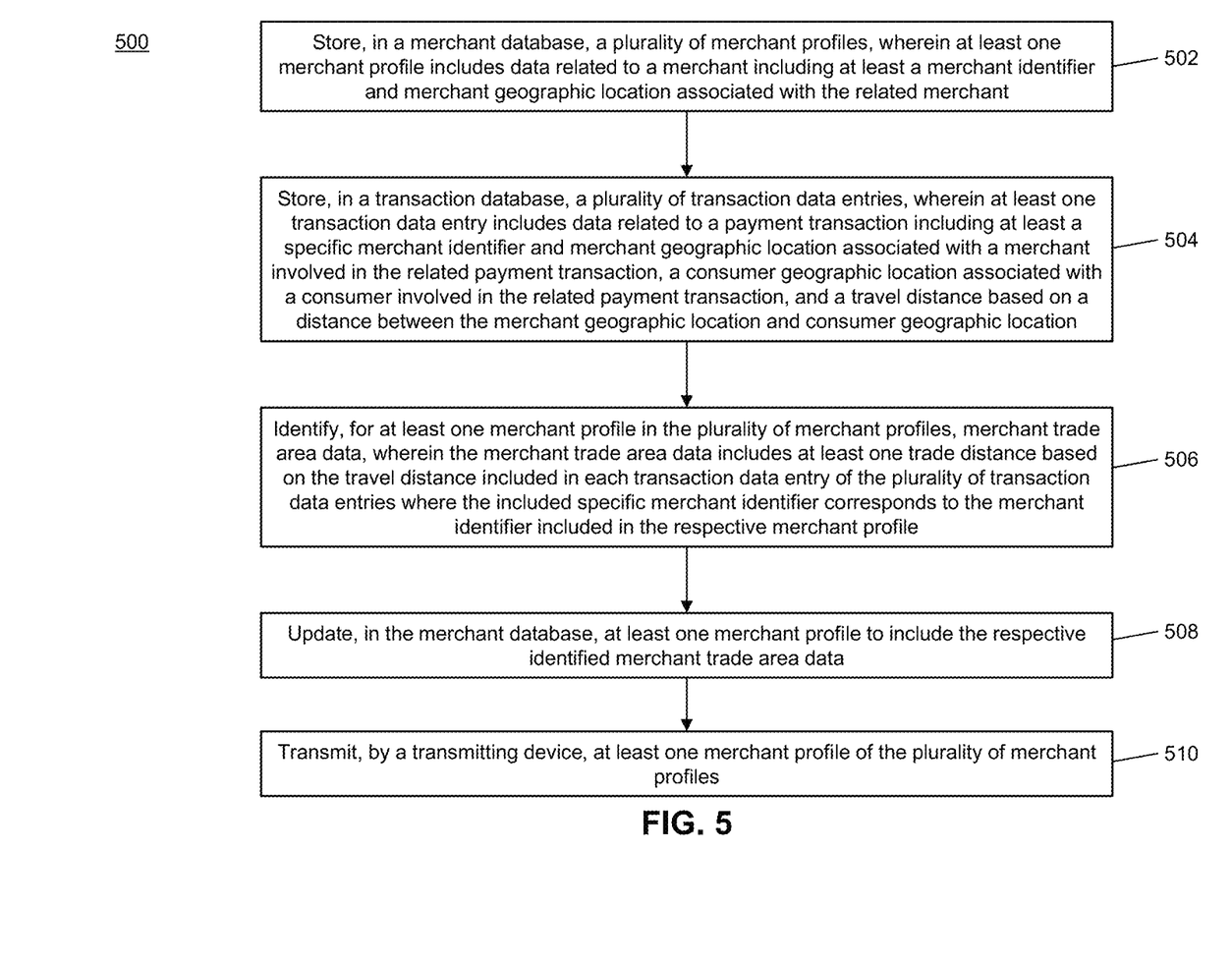
FIG. 5 is a flow chart illustrating an exemplary method for identifying merchant trade areas for search result filtering in accordance with exemplary embodiments.

Exemplary Method for Identifying Merchant Trade Areas for Search Result Filtering FIG. 5 illustrates a method 500 for the identification of merchant trade areas based on transaction data for use in filtering search results.

In step 502, a plurality of merchant profiles (e.g., merchant profiles 310) may be stored in a merchant database (e.g., the merchant database 308), wherein at least one merchant profile 310 includes data related to a merchant including at least a merchant identifier and a merchant geographic location associated with the related merchant. In step 504, a plurality of transaction data entries (e.g., transaction data entries 314) may be stored in a transaction database (e.g., the transaction database 312), wherein at least one transaction data entry 314 includes data related to a payment transaction including at least a specific merchant identifier and merchant geographic location associated with a merchant involved in the related payment transaction, a consumer primary geographic location associated with a consumer involved in the related payment transaction, and a travel distance based on a distance between the merchant geographic location and consumer primary geographic location.

In some embodiments, the at least one trade distance corresponds to a distance greater than or equal to an average of the travel distance included in each transaction data entry 314 of the plurality of transaction data entries 314 where the included merchant identifier corresponds to the merchant identifier included in the respective merchant profile 310. In one embodiment, the at least one trade distance may include a first trade distance corresponding to a distance including seventy-five percent of the travel distances included in each associated transaction data entry 314, a second trade distance corresponding to a distance including fifty percent of the travel distances included in each associated transaction data entry 314, and a third trade distance corresponding to a distance including twenty-five percent of the travel distances included in each associated transaction data entry 314.

In step 506, merchant trade area data may be identified for each merchant profile 310 in the plurality of merchant profiles 310, wherein the merchant trade area data includes at least one trade distance based on the travel distance included in each transaction data entry of the plurality of transaction data entries where the included specific merchant identifier corresponds to the merchant identifier included in the respective merchant profile 310. In some embodiments, each of the at least one trade distance may be represented as one or more of a centroid of the area covered by a zip code, extended postal zip code or other postal code, governmental demarcation (e.g., street, neighborhood, town, borough, city, county, etc.), or a map outlining the trade area associated with a location at the respective trade distance from the merchant geographic location. In one embodiment, each transaction data entry 314 may further include a transaction amount, and each of the at least one trade distances is further based on the transaction amount included in each associated transaction data entry 314.

In step 508, at least one merchant profile 310 in the merchant database 308 may be updated to include the respective identified merchant trade area data. In step 510, at least one merchant profile 310 of the plurality of merchant profiles 310 may be transmitted by a transmitting device (e.g., the transmitting unit 306). In some embodiments, transmitting at least one merchant profile 310 includes transmitting two or more merchant profiles 310 to a search engine provider (e.g., the search engine processing server 104) for use of the included merchant trade area data in filtering and/or ranking search results.

Exemplary Method for Filtering Search Results Based on Merchant Trade Areas

Figure 6:
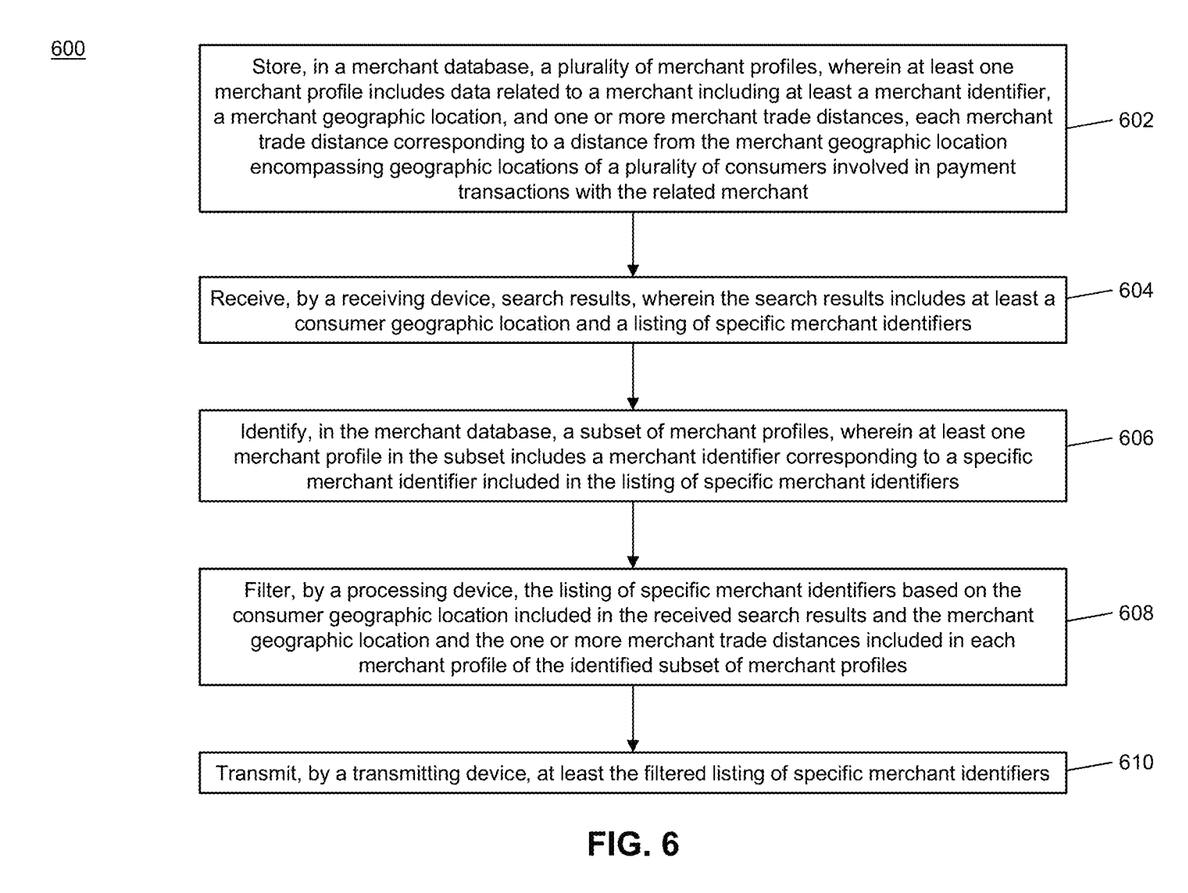
FIG. 6 is a flow chart illustrating an exemplary method for filtering search results based on merchant trade areas in accordance with exemplary embodiments.

FIG. 6 illustrates a method 600 for filtering search results based on a geographic location and merchant trade areas based on transaction data.

In step 602, a plurality of merchant profiles (e.g., merchant profiles 210 or merchant profiles 310) may be stored in a merchant database (e.g., the merchant database 208 or the merchant database 308), wherein at least one merchant profile includes data related to a merchant including at least a merchant identifier, a merchant geographic location, and one or more merchant trade distances, each merchant trade distance corresponding to a distance from the merchant geographic location encompassing geographic locations of a plurality of consumers involved in payment transactions with the related merchant. In one embodiment, the one or more merchant trade distances may include a first trade distance corresponding to a distance including seventy-five percent of a trade area of the related merchant, a second trade distance corresponding to a distance including fifty percent of a trade area of the related merchant, and a third trade distance corresponding to a distance including twenty-five percent of a trade area of the related merchant. In some embodiments, the one or more merchant trade distances may be represented as one or more zip codes or postal codes.

In step 604, search results may be received by a receiving device (e.g., the receiving unit 202 or the receiving unit 302), wherein the search results includes at least a consumer primary geographic location and a listing of specific merchant identifiers. In step 606, a subset of merchant profiles may be identified in the merchant database, wherein at least one merchant profile in the subset includes a merchant identifier corresponding to a specific merchant identifier included in the listing of specific merchant identifiers.

In step 608, the listing of specific merchant identifiers may be filtered by a processing device (e.g., the processing unit 204 or the processing unit 304) based on the consumer primary geographic location included in the received search results and the merchant geographic location and the one or more merchant trade distances included in each merchant profile of the identified subset of merchant profiles. In some embodiments, filtering the listing of specific merchant identifiers may include at least one of: reordering the listing of specific merchant identifiers and removing one or more specific merchant identifiers from the listing of specific merchant identifiers. In step 610, at least the filtered listing of specific merchant identifiers may be transmitted by a transmitting device (e.g., the transmitting unit 206 or the transmitting unit 306).

Computer System Architecture

FIG. 7 illustrates a computer system 700 in which embodiments of the present disclosure, or portions thereof, may be implemented as computer-readable code. For example, the search engine processing server 104 and trade area processing server 106 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Techniques consistent with the present disclosure provide, among other features, systems and methods for identifying merchant trade areas and use thereof in filtering search results. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for filtering search results based on merchant trade areas, comprising:
storing, in a merchant database of a trade area processing server, a plurality of merchant profiles, wherein at least one merchant profile includes data related to a merchant including at least a merchant identifier, a merchant geographic location associated with the merchant, and one or more merchant trade distances, wherein each merchant trade distance corresponds to a distance from the merchant geographic location that encompasses geographic locations of a plurality of consumers involved in payment transactions with the related merchant;
receiving, by a receiving device of the trade area processing server, search results from a search engine processing server, wherein the search results includes at least a consumer primary geographic location and a listing of specific merchant identifiers, wherein the consumer primary geographic location represents a centroid geographical location of geographical locations of past payment transactions involving a related consumer, wherein the centroid geographical location is located in a government-demarked area different from a government-demarked area of a residence of the related consumer;
identifying, in the merchant database, a subset of merchant profiles, wherein each merchant profile in the subset includes a merchant identifier corresponding to a specific merchant identifier included in the listing of specific merchant identifiers;
filtering, by a processing device of the trade area processing server, the listing of specific merchant identifiers by reordering the listing of specific merchant identifiers based on (i) the consumer primary geographic location included in the received search results, and (ii) the merchant geographic location and the one or more merchant trade distances included in each merchant profile of the identified subset of merchant profiles; and
transmitting, by a transmitting device of the trade area processing server, at least the filtered listing of specific merchant identifiers to the search engine processing server for presentation to the user.

2. The method of claim 1, wherein filtering the listing of specific merchant identifiers further includes removing one or more specific merchant identifiers from the listing of specific merchant identifiers.

3. The method of claim 1, wherein the one or more trade distances includes a first trade distance corresponding to a distance including seventy-five percent of a trade area of the related merchant, a second trade distance corresponding to a distance including fifty percent of a trade area of the related merchant, and a third trade distance corresponding to a distance including twenty-five percent of a trade area of the related merchant.

4. The method of claim 1, wherein each of the one or more merchant trade distances is represented as one or more zip codes or postal codes.

5. A system for filtering search results based on merchant trade areas, comprising:
a merchant database, of a trade area processing server, configured to store a plurality of merchant profiles, wherein at least one merchant profile includes data related to a merchant including at least a merchant identifier, a merchant geographic location associated with the merchant, and one or more merchant trade distances, wherein each merchant trade distance corresponds to a distance from the merchant geographic location that encompasses geographic locations of a plurality of consumers involved in payment transactions with the related merchant;
a receiving device, of the trade area processing server, configured to receive search results from a search engine processing server, wherein the search results includes at least a consumer primary geographic location and a listing of specific merchant identifiers, wherein the consumer primary geographic location represents a centroid geographical location of geographical locations of past payment transactions involving a related consumer, wherein the centroid geographical location is located in a government-demarked area different from a government-demarked area of a residence of the related consumer;

a processing device, of the trade area processing server, configured to identify, in the merchant database, a subset of merchant profiles, wherein each merchant profile in the subset includes a merchant identifier corresponding to a specific merchant identifier included in the listing of specific merchant identifiers, and filter the listing of specific merchant identifiers by reordering the listing of specific merchant identifiers based on (i) the consumer primary geographic location included in the received search results, and (ii) the merchant geographic location and the one or more merchant trade distances included in each merchant profile of the identified subset of merchant profiles; and a transmitting device, of the trade area processing server, configured to transmit at least the filtered listing of specific merchant identifiers to the search engine processing server for presentation to the user.

6. The system of claim 5, wherein filtering the listing of specific merchant identifiers further includes removing one or more specific merchant identifiers from the listing of specific merchant identifiers.

7. The system of claim 5, wherein the one or more trade distances includes a first trade distance corresponding to a distance including seventy-five percent of a trade area of the related merchant, a second trade distance corresponding to a distance including fifty percent of a trade area of the related merchant, and a third trade distance corresponding to a distance including twenty-five percent of a trade area of the related merchant.

8. The system of claim 5, wherein each of the one or more merchant trade distances is represented as one or more zip codes or postal codes.

* * * * *